US010825160B2

(12) United States Patent
Hu (10) Patent No.: US 10,825,160 B2
(45) Date of Patent: Nov. 3, 2020

(54) SPATIALLY DYNAMIC FUSION OF IMAGES OF DIFFERENT QUALITIES

(71) Applicant: Goodrich Corporation, Charlotte, NC (US)

(72) Inventor: Haijun Hu, Westford, MA (US)

(73) Assignee: Goodrich Corporation, Charlotte, NC (US)

(*) Notice: Subject to any disclaimer, the term of this patent is extended or adjusted under 35 U.S.C. 154(b) by 89 days.

(21) Appl. No.: 16/218,027

(22) Filed: Dec. 12, 2018

(65) Prior Publication Data

US 2020/0193583 A1 Jun. 18, 2020

(51) Int. Cl.
*G06T 7/00* (2017.01)
*G06T 7/11* (2017.01)
(Continued)

(52) U.S. Cl.
CPC .......... *G06T 7/0002* (2013.01); *G06T 3/0068* (2013.01); *G06T 5/009* (2013.01);
(Continued)

(58) Field of Classification Search
CPC ......... G06T 7/0002; G06T 5/50; G06T 5/009; G06T 3/0068; G06T 7/11; G06T 2207/20221
See application file for complete search history.

(56) References Cited

U.S. PATENT DOCUMENTS 9,684,963 B2 6/2017 Grant et al.
9,842,264 B2 12/2017 Kwan et al.
(Continued)

FOREIGN PATENT DOCUMENTS

CN 107025641 A 8/2017

OTHER PUBLICATIONS

Extended European Search Report for European Patent Application No. EP19215784.0, dated Apr. 28, 2020.

*Primary Examiner* — Ming Y Hon
(74) *Attorney, Agent, or Firm* — Locke Lord LLP; Scott D. Wofsy; Judy R. Naamat (57) ABSTRACT

A system and method of processing an image is provided in which an input image output by an imaging sensor is received. For each location of a plurality of locations of a reference point of a moving window in the input image, a first image quality metric is determined as a function of quality of first image content included in a region covered by the moving window, wherein the window is sized to include at least a significant portion of a target of interest. An enhancement process is applied to the input image and generates a resulting enhanced image that is spatially registered with the input image. For each location of the plurality of locations of the reference point of the moving window in the enhanced image, a second image quality metric is determined as a function of quality of second image content included in the region covered by the moving window. For each location of the plurality of locations, first fused content is determined by a first fusing of the first image content with the second image content, the first fusing being a function of the first image content, the first image quality metric, the second image content, and the second image quality metric associated with the location. A fused image is generated that includes the first fused content determined for each of the locations of the plurality of locations.

20 Claims, 6 Drawing Sheets

(51) Int. Cl.
  *G06T 3/00*  (2006.01)
  *G06T 5/00*  (2006.01)
  *G06T 5/50*  (2006.01)

(52) U.S. Cl.
  CPC .................. *G06T 5/50* (2013.01); *G06T 7/11*
      (2017.01); *G06T 2207/20221* (2013.01)

(56) References Cited

U.S. PATENT DOCUMENTS

| | | |
|---|---|---|
| 10,091,439 B2 | 10/2018 | Hogasten et al. |
| 10,122,943 B1* | 11/2018 | Chen .................. H04N 5/2258 |
| 2005/0074158 A1* | 4/2005 | Kaufhold .................. G06T 5/50 |
| | | 382/132 |
| 2006/0269158 A1* | 11/2006 | O'Hara .................. G06T 5/50 |
| | | 382/254 |
| 2008/0199059 A1* | 8/2008 | Eck ...................... A61B 8/0833 |
| | | 382/128 |
| 2012/0007979 A1 | 1/2012 | Schneider et al. |
| 2013/0028490 A1 | 1/2013 | Kim et al. |
| 2013/0038626 A1 | 2/2013 | Feda |
| 2013/0107072 A1* | 5/2013 | Kumar ................. H04N 5/2258 |
| | | 348/222.1 |
| 2014/0168444 A1* | 6/2014 | Bae ........................ H04N 5/332 |
| | | 348/164 |
| 2014/0341481 A1* | 11/2014 | Panetta .................... G06T 5/50 |
| | | 382/274 |
| 2016/0125599 A1 | 5/2016 | Stampanoni et al. |
| 2018/0005417 A1* | 1/2018 | Schieke .................... G06T 7/30 |
| 2018/0239991 A1 | 8/2018 | Weller et al. |

\* cited by examiner

401 — Apply operations 402-412 to image produced by second image sensor (for determining a second quality metric and a second enhanced quality metric that are used to generate a second fused image)

502 — For each location in the first fused image of a reference point centered by the moving window, determine a third input quality metric as a function of evaluation of image content in the first fused image for a region covered by the moving window 504 — For each location in the second fused image of a reference point centered by the moving window, determine a fourth input quality metric as a function of evaluation of image content in the second fused image for a region covered by the moving window 506 — For each location in the first fused image and a corresponding location in the second fused image, determine a normalized channel gain 508 — For each location in the first fused image of the reference point and its corresponding location in the second fused image, fuse (using the normalized channel gain) first image content associated with the location in the first fused image with image content associated with the corresponding location in the second fused image 510 — Generate a third fused image that includes fused content for each location of the first fused image and its corresponding location in the second fused image

SPATIALLY DYNAMIC FUSION OF IMAGES OF DIFFERENT QUALITIES

BACKGROUND OF THE INVENTION

1. Field of the Invention

The present disclosure relates to image processing, and more particularly to spatially dynamic fusion of images of different qualities.

2. Description of Related Art

Multi-spectral imaging involves using respective imaging sensors to image a scene, e.g., in different wavelength bands. Typically the multiple imaging sensors each image the scene and generate an image. Each imaging sensor has different strengths and weaknesses related to imaging that affect the quality of the respective images generated. For each of the respective images generated, image quality can vary spatially across the imaged scene. Each of the images captured from the different sensors can have strengths and weaknesses relative to the other in different regions of the image. Similarly, an image captured with a single image sensor can be enhanced by an enhancement process. Each of the original image before enhancement and the enhanced image can have strengths and weaknesses relative to the other in different regions of the image. However there are considerable difficulties in taking advantage of the strengths of each of the imaging sensors and variations in image quality spatially across the imaged scene while minimizing the associated weaknesses.

The conventional techniques have been considered satisfactory for their intended purpose. However, there is an ever present need for improved fusion of images of different spatially varying qualities. This disclosure provides a solution for this need.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is an image processing system having a memory configured to store instructions and a processor disposed in communication with the memory, wherein the processor, upon execution of the instructions is configured to determine for each location of a plurality of locations of a reference point of a moving window in the input image, a first image quality metric as a function of quality of first image content included in a region covered by the moving window. The window is sized to include at least a significant portion of a target of interest.

An enhancement process is applied to the input image and generates a resulting enhanced image that is spatially registered with the input image. For each location of the plurality of locations of the reference point of the moving window in the enhanced image, a second image quality metric is determined as a function of quality of second image content included in the region covered by the moving window. For each of the plurality of locations, first fused content is determined by a first fusing of the first image content with the second image content, the first fusing being a function of the first image content, the first image quality metric, the second image content, and the second image quality metric associated with the location. A fused image is generated that includes the first fused content determined for each of the locations of the plurality of locations.

In another aspect, a method of processing an image is provided. The method includes receiving an input image output by an imaging sensor, and for each location of a plurality of locations of a reference point of a moving window in the input image, determining a first image quality metric as a function of quality of first image content included in a region covered by the moving window. The window is sized to include at least a significant portion of a target of interest. The method further includes applying an enhancement process to the input image and generate a resulting enhanced image that is spatially registered with the input image; for each location of the plurality of locations of the reference point of the moving window in the enhanced image, determining a second image quality metric as a function of quality of second image content included in the region covered by the moving window; and for each location of the plurality of locations, determining first fused content by a first fusing of the first image content with the second image content, wherein the first fusing is a function of the first image content, the first image quality metric, the second image content, and the second image quality metric associated with the location. The method further includes generating a fused image that includes the first fused content determined for each of the locations of the plurality of locations.

In accordance with still another aspect of the disclosure, a non-transitory computer readable storage medium having one or more computer programs stored therein is provided. The computer programs associated with each layer comprising instructions, which when executed by a processor of a computer system, cause the processor to perform the operations of the method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
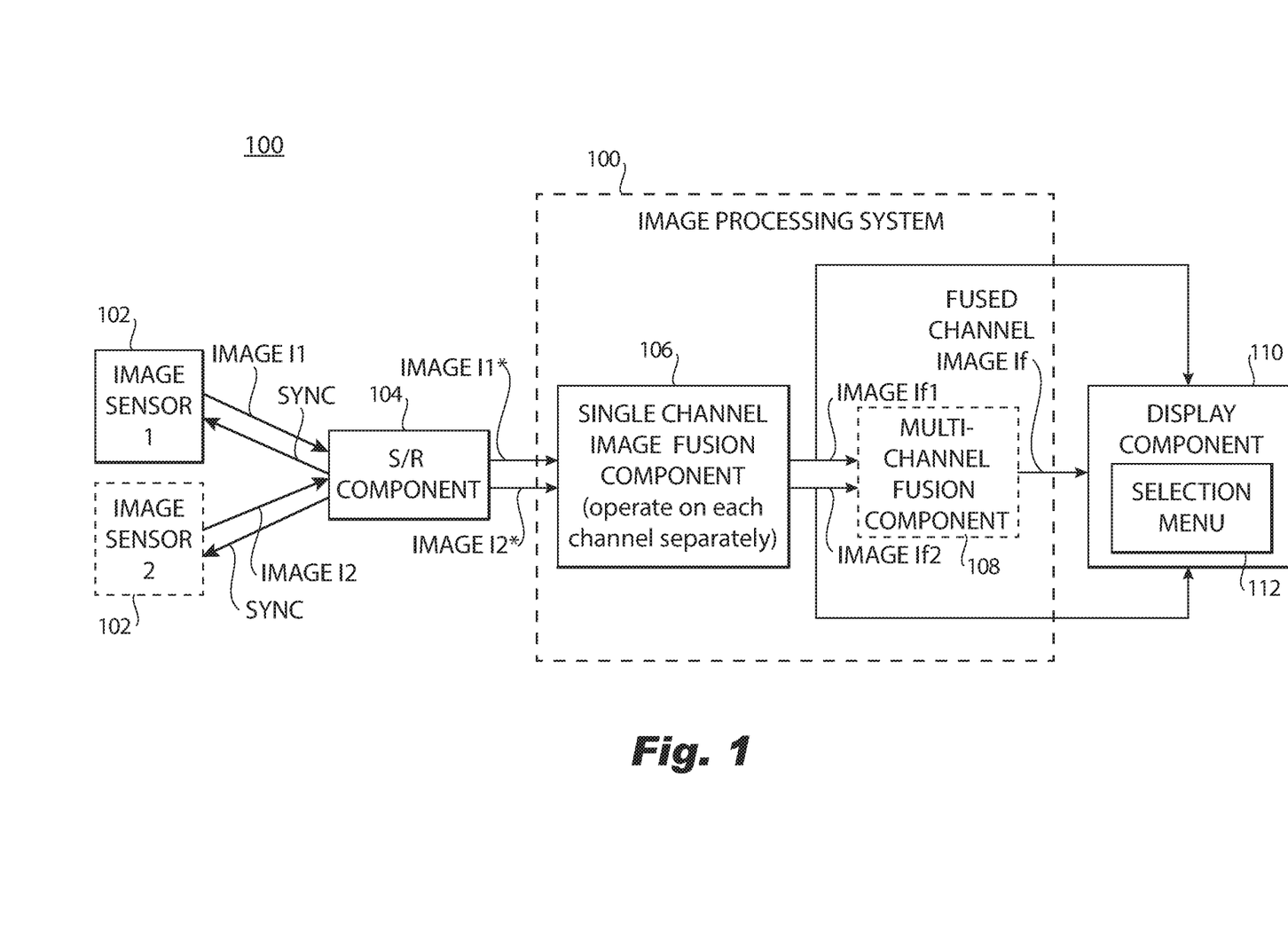
FIG. 1 is a block diagram of an exemplary embodiment of a multi-channel (MC) image processing system that performs multi-channel fusion in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a fusion image processing system in accordance with the disclosure is shown in FIG. 1 and is designated generally by reference character 100. Methods associated with operations of the fusion image processing system 100 in accordance with the disclosure, or aspects thereof, are provided in FIGS. 2 and 3, as will be described. The systems and methods described herein can be used for live, real time registration of multi-sensor image data, e.g., multi-spectral image data, including still and/or streaming image data.

The fusion image processing system 100 receives images from at least one of first and second image sensors 102, includes a synchronization and registration (S/R) component 104, single-channel image fusion component 106, and multi-channel fusion component 108, and outputs a channel-fused image If to a display component 110.

In a single-channel embodiment, the S/R component 104 receives images from only one of first and second image sensors 102. Output of the single-channel image fusion component 106 is provided to the display component 110 and is not processed by then multi-channel fusion component 108. The second image sensor 102 and the multi-channel fusion component 108 are shown in dotted lines, as these elements can be omitted in the single-channel embodiment.

In a multi-channel embodiment, the S/R component 104 receives images from both the first and second image sensors 102. Output of the single-channel image fusion component 106 is provided to the multi-channel fusion component 108. Output from the and/or the multi-channel fusion component 108 can be provided to the display component 110, and a selection menu 112 can be provided to select which output to display.

Each of the first and second image sensors 102 includes a sensor that is sensitive to a particular wavelength range (channel) and outputs image data for that channel, wherein the first image sensor 102 is sensitive to a first wavelength range which is different than a second wavelength range to which the second image sensor 102 is sensitive. In this way, the fusion image processing system 100 receives multi-channel image data. The image data can include still images or streaming images. In embodiments, at least one of the first and second wavelength ranges is in the infrared range. In embodiments, both the first and second wavelength ranges can be in the infrared range. In the example shown, the first wavelength range corresponds to short wave infrared (SWIR) wavelengths, e.g., 0.6 µm-1.7 µm and the second wavelength range corresponds to long wave infrared (LWIR) wavelengths, e.g., 8 µm-12 µm. In embodiments, the first and second image sensors can work in the same or different spectral wavelength range. In an embodiment in which the first and second image sensors 102 work in the same spectral wavelength, the first image sensor 102 can output images having a different quality than images output by the second image sensor 102.

Those skilled in the art will readily appreciate that additional image sensors can be included, and that any suitable wavelengths (including visible) can be used without departing from the scope of this disclosure.

The output of each of the respective image sensors 102 corresponds to a different channel. FIG. 1 shows first image sensor 102 outputting sensed image I1 in a first channel and second image sensor 102 outputting sensed image I2 in a second channel. Image I1 and image I2 were taken simultaneously based on the SYNCH control messages provided by S/R component 104.

S/R component 104 can be included with or external to the fusion image processing system 100. Portions or all of S/R component 104 can be included in an imaging system that includes one or more of first and second image sensors 102. The S/R component 104 can include separate or integrated components for sending a synchronization signal to synchronize capture of image data by the first and second image sensors 102 and spatially registering image data output from the first and second image sensors 102. In operation, the S/R component 104 sends synchronization control signals SYNCH to synchronize capture of a first image, image I1, from the first image sensor 102 and a second image, image I2, from the second image sensor 102. The S/R component 104 further registers image I1 and image I2 relative to one another and outputs image data from the first and second image sensors 102. The S/R component 104 outputs image I1* and image I2* that are registered relative to one another and were captured in a synchronized fashion. Image I1* corresponds to the first channel and image I2* corresponds to the second channel.

Figure 2:
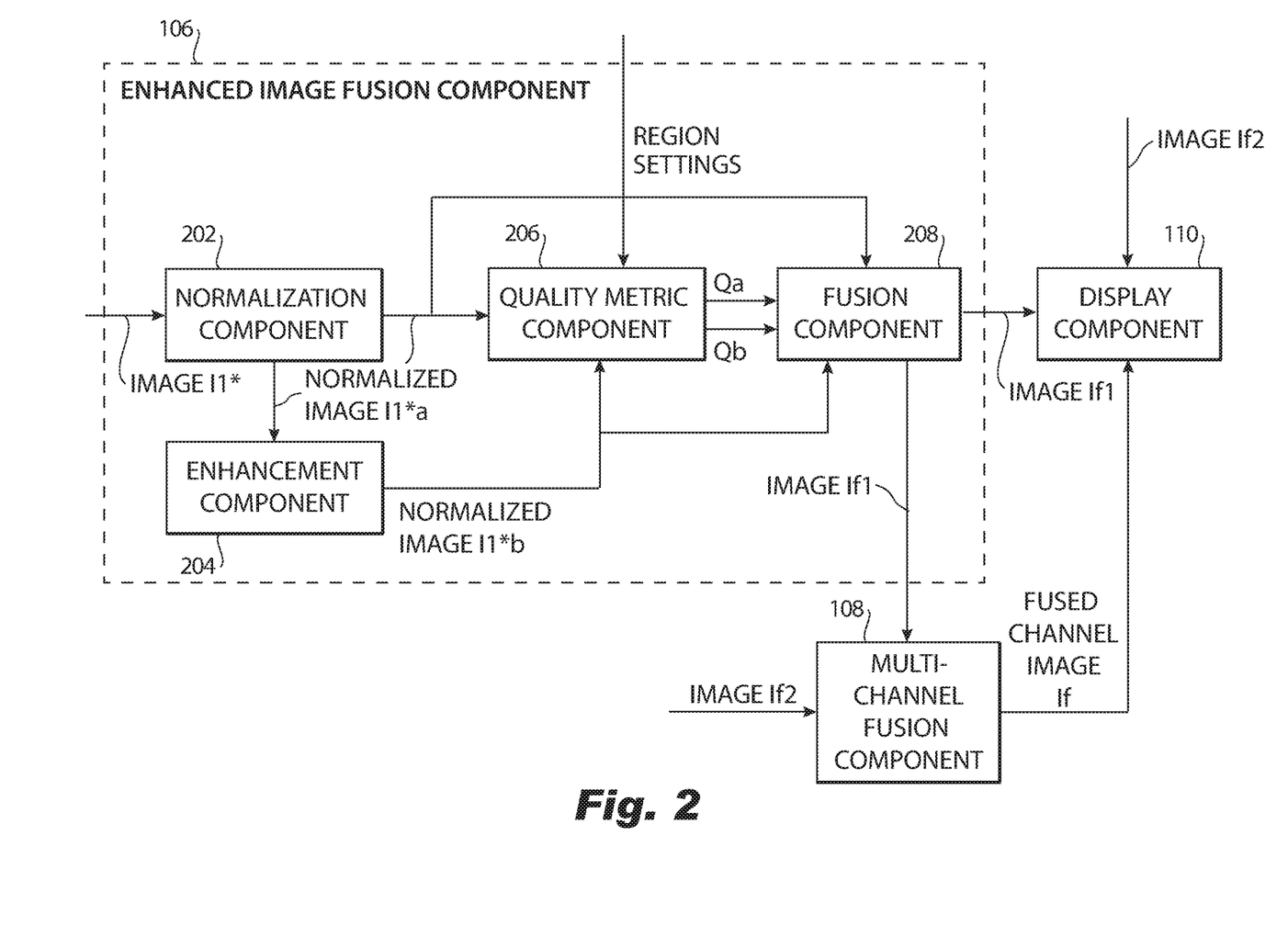
FIG. 2 is a block diagram of an exemplary embodiment of an enhanced image fusion component of the MC image processing system.

Each of image I1* and image I2* are processed separately by single-channel image fusion component 106, which is shown and described in greater detail in FIG. 2 and in the corresponding description. Single-channel image fusion component 106 processes image I1* and outputs fused image If1 that corresponds to the first channel. Single-channel image fusion component 106 also processes image I2* and outputs fused image If2 that corresponds to the second channel. Multi-channel fusion component 108 processes image If1 and image If2 and outputs a fused channel image If. The fused channel image If is provided to the display component 110, which can be included with or external from the fusion image processing system 100. The display component 110 can display image If1, image If2 or fused channel image If. The decision regarding which image to display can be based on a selection from a selection menu 112 provided by the display component 110.

With reference to FIG. 2, the single-channel image fusion component 106 is shown in greater detail. The single-channel image fusion component 106 can include a normalization component 202, an enhancement component 204, a quality metric component 206, and a fusion component 208.

The single-channel image fusion component 106 processes image I1* of the first channel and further processes image I2* of the second channel, wherein images 1* and 2* are processed separately. For example, images 1* and 2* can be processed at the same time, e.g., in parallel, staggered, or sequentially. The example shown in FIG. 1 shows the single-channel image fusion component 106 receiving and processing image I1* and outputting image If1 to the display 110 and/or the channel fusion component 108. In the example shown, image If2 is also provided to the channel fusion component 108. Image I2* was also processed by the single-channel image fusion component 106, either simultaneously, staggered, or sequential relative to the processing of image I1*, with the result of the processing being provided as image If2 to display 110 and/or channel fusion component 108.

The normalization component 202 receives an image from one of the channels, which in the example shown in FIG. 2 is image I1* of the first channel. Image I1* is an M×N M×N array of pixels, with pixel value denoted as Ia (i,j) at row and column locations of (i,j), and the subscript "a" indicating that the image is not enhanced. A linear normalization of the image is performed, such as in accordance with example Equation (1):

$$I_N(i, j) = \frac{I_a(i, j) - \min(I_a)}{\max(I_a) - \min(I_a)} \times (I_{max} - I_{min}) + I_{min}, \quad (1)$$

wherein In(i,j) is the normalized image, max(Ia) and min(Ia) are functions to compute frame-wide (also referred to as global) maximum and minimum values of the input image I1*; Imax and Imin are desired maximum and minimum output values, which can be based, for example, on an intended bit depth for unsigned integer representation (e.g., Imax is often set at 255 for 8-bit integers, and 65,535 for 16-bit integers, whereas Imin can be set to any integer value less than Imax $I_{max}$). The normalized image is provided as normalized image I1*a to the enhancement component 204 and the quality metric component 206, wherein the term "a" stands for pre-enhanced (meaning an enhancement process was not yet applied).

The enhancement component 204 receives the normalized image I1*a, applies an enhancement process to the received image, and outputs normalized image I1*b, wherein the term "b" stands for enhanced by enhancement process. Images I1*a and I1*b are spatially registered, so that each location in image I1*a has a corresponding image in I1*b, wherein the corresponding locations have the same pixel coordinates. The enhancement process can be configured to enhance contrast. The enhancement process is performed to enhance contrast on a local scale, which is smaller than the regional and global scales, for example 3-7 pixels across any direction. The local scale is sized to capture and retain details of features of a target of interest or details of features of a background element of the image being processed by the enhancement process, which increases the probability of detecting and displaying potential targets of interest. In order to apply the enhancement process effectively across the entire image on a frame-wide basis, however, statistics determined on the global scale (also referred to as frame-wide scale) can be taken into account.

Additionally, to further improve enhancement performance, enhancement can include statistics from an intermediate scale (also referred to as regional scale) between the local and global scales. An example enhancement process is local area contrast enhancement (LACE), which is intended to retain features of the finest spatial resolution while enhancing contrast. LACE can capture small features in an image while scaling with overall (global-scale) scene brightness of the image. The global scale is based on frame-wide statistics that improves conditioning and scaling of the output of an enhanced image output by the enhanced processing. LACE is explained, for example, in U.S. Patent Publication No. 2013/0038626A1 to Feda.

The quality metric component 206 receives the normalized images I1*a and I1*b and outputs an image quality metric as defined below.

The quality metric component 206 determines an image quality metric Qa for image I1*a and quality metric Qb for image I1*b for corresponding locations at the center of a moving window, and calculates an enhancement gain for the first channel as a function of image quality metrics Qa and Qb. The image quality metric is defined as the effective signal-to-noise ratio of an image determined on the regional scale. The moving window is sized at a regional scale size and has a reference point, such as its center. Most targets of interest would be captured by the regional-scale moving window, which is for example 11-129 pixels across in any direction. The regional scale is important to target-background differentiation and for target detection. The moving window is sized to move to at least tens of different positions in the image being processed. In embodiments, the moving window is sized to move to hundreds or more positions in the image.

The quality metric component 206 determines the regional-scale image quality metric for each location of the reference point of the moving window for each of images I1*a and I1*b. The moving window is moved so that its reference point advances to each pixel location of the image, covering the entire scene. For each of the images I1*a and I1*b, for each of the locations of the reference point of the moving window, the image quality metric is computed for quality of image content in a region covered by the moving window. The moving window is slid pixel by pixel so that an image quality metric matrix the same size as the input image is generated. In embodiments, the movement of the window can be configurable, and the disclosure is not limited to sliding the moving one pixel at a time or requiring that every pixel be weighted equally.

Characteristics of the moving window are defined by region settings provided to the quality metric component 206. These region settings can be input via a user interface of the image processing system 100 or received by another processing device. The region settings can define a window function applied to the moving window. In embodiments, based on the window function applied, the moving window can use, for example, a function of equal weights or some other functions such as a Gaussian function.

For image I1*a of size M×N, the region covered by the moving window includes m×n pixels centered at location $(i_c, j_c)$. In the examples that follow, the reference point of the window is treated as this center location. In embodiments, the disclosure is not limited to the reference point of the moving window being at its center. The terms m and n that define the size of the moving window and center index c that defines the center of the moving window can be included in the region settings. The regional scale is defined by the size of the moving window. In embodiments, m and n can be the same value, or of different values.

An example image quality metric determined for each location of its reference point of the moving window can be determined using the moving window's effective signal to noise ratio (S/N). The effective S/N for the center pixel c of the moving window is determined by computing the mean and standard deviation for the region covered by the moving window. The regional statistics for the image include the effective S/N determined for each location of the center of the moving window as the moving window is slid, e.g., by moving its center c from pixel to pixel. The effective S/N for the location of the center is determined in accordance with Equations (2) and (3). The moving window is slid so that its center $i_c, j_c$ is moved from pixel to pixel of each of the pixels of image I1*$a$. The effective S/N is determined using Equations (2) and (3) for each location of the center of the moving window in image I1*$a$. The same procedure is applied to image I1*$b$ using Equations (2) and (3):

$$\overline{S_{i_c,j_c}} = \frac{\sum_{\substack{-\frac{m}{2} \leq i - i_c < m/2 \\ -\frac{n}{2} \leq j - j_c < n/2}} I_a(i,j)}{m*n}, \quad (2)$$

$$1 \leq i, i_c \leq M, 1 \leq j, j_c \leq N$$

$$\overline{N_{i_c,j_c}} = \frac{\sum_{\substack{-\frac{m}{2} \leq i - i_c < m/2 \\ -\frac{n}{2} \leq j - j_c < n/2}} (I_a(i,j) - \overline{S_{i_c j_c}})^2}{m*n - 1}, \quad (3)$$

$$1 \leq i, i_c \leq M, 1 \leq j, j_c \leq N$$

wherein $I_a(i,j)$ represents the original, or normalized, input pixel value at location (i,j). Centered estimates of these quantities are obtained with m and n being odd numbers.

The quality metric component 206 determines for each of images I1*$a$ and I1*$b$ at each location of the center of the moving window, an image quality metric Q (which represents Qa for the pre-enhancement image I1*$a$ and Qb for the enhanced image I1*$b$) using content of the region covered by the moving window. The image quality metric can be determined using the effective signal to noise ratio in accordance with Equation (4). The image quality metric is determined using Equation (4) for each location in image I1*$a$ of the center of the moving window. The same procedure is applied to image I1*$b$ using Equations (4):

$$Q_{i_c,j_c} = \frac{\overline{S_{i_c,j_c}}}{\overline{N_{i_c,j_c}}}, 1 \leq i_c \leq M, 1 \leq j_c \leq N. \quad (4)$$

For each location in the image I1*$a$ (before enhancement) and its corresponding location in image I1*$b$, the fusion component 208 determines an enhancement gain, which is gain due to the enhancement processing. The enhancement gain is defined in accordance with Equation (5): For each iteration of Equation (5), the location $i_c, j_c$ is moved to the next pixel, so that Equation (5) is applied to each location in image I1*$a$ and its corresponding location in image I*$b$:

$$G_{i_c,j_c} = \frac{Q^b_{i_c,j_c}}{Q^a_{i_c,j_c}}, 1 \leq i_c \leq M, 1 \leq j_c \leq N, \quad (5)$$

wherein the superscripts a and b denote respective image quality Q before and after the enhancement processing and $i_c, j_c$ denote the location. In other words, the enhancement gain is determined for each location $i_c, j_c$ in the image I1*$a$ that functioned as the center of the moving window when determining its image quality metric and the corresponding location of the image I1*$b$ that functioned as the center of the moving window when determining its image quality metric.

The fusion component 208 can further normalize the enhancement gain determined for each location $i_c, j_c$ in image I1*$a$ and its corresponding location in image I1*$b$ in accordance with Equation (6). For each iteration of Equation (6), the location $i_c, j_c$ is moved to the next pixel, so that Equation (6) is applied to each location in image I1*$a$ and its corresponding location in image I*$b$:

$$W_{i_c,j_c} = \begin{cases} 0.1 + 0.4 * G_{i_c,j_c} / \max(G_{i_c,j_c}), & G_{i_c,j_c} < 1.0 \\ 0.5 + 0.5 * (G_{i_c,j_c} - 1)/(G_{i_c,j_c}), & G_{i_c,j_c} \geq 1.0 \end{cases} \quad (6)$$

The normalization of the enhancement gain provided by application of Equation (6) provides scene content-dependent weighting per region that is proportional to each region's enhancement gain. A minimum weight of 0.1 is used in the normalized weighting function of Equation (6) to ensure application of a minimum amount of blending from the lower quality image. The coefficients in Equation (6) may be adjusted in practice to achieve more desirable results.

The fusion component 208 further generates a fused image for a given channel, for example, If1 for the first channel. The fused image If1 is the same size as and spatially registered with the input image I1*$a$ and enhanced image I1*$b$. The fused image If1 is generated by applying Equation (7) below, using the normalization of the enhancement gain determined for each of the corresponding spatial weighting functions. The fusion component 208 generates the fused image using the normalized enhancement gain of each location $i_c, j_c$ in image I1*$a$ and the corresponding location in image I1*$b$, wherein the image quality metric was determined for each of these locations on a regional scale, thus providing a spatially dynamic weighting function applied in accordance with Equation (7). For each iteration of Equation (7), the location $i_c, j_c$ is moved to the next pixel, so that Equation (7) is applied to each location in image I1*$a$ and its corresponding location in image I*$b$:

$$I_{f1}(i,j) = I_a(i,j)(1 - W_{i,j}) + I_b(i,j)W_{i,j}, 1 \leq i \leq M, 1 \leq j \leq N \quad (7)$$

wherein the subscript c in indices i and j is dropped to simplify notations, with the understanding that all relevant metrics are implicitly calculated for corresponding locations of the images I1*$a$ and I1*$b$ having the coordinates $i_c, j_c$, which is the location of the center of the moving window in each of the images I1*$a$ and I1*$b$ when the image quality metrics were determined.

In embodiments, only one channel is used, meaning only one image sensor 102, e.g., the first or second image sensor 102, is provided to the fusion component 208, which applies Equations (1)-(7) to an image or streaming images captured by that image sensor 102. Regardless of whether both or one of the first and second image sensors 102 are provided, the single-channel fused images If1 and/or If2 can be provided to the display component 110. In embodiments, the channel fusion component 208 is omitted.

In embodiments, fusion component 208 processes both first and second channels associated with the respective first and second image sensors 102. The fusion component 208 outputs fused image If1 for each image I1 (e.g., still or streaming images) generated by the first channel and outputs second fused image If2 for each image I2 generated by the second channel. The second fused image If2 is the same size as and spatially registered with the second input image I2*$a$ and enhanced image I2*$b$. Since the input image I1*$a$ and the second input image I2*$a$ are spatially registered relative to one another, it follows that the fused image If1 and the second fused image If2 are spatially registered relative to one another. According, for a first image (input, enhanced, or fused) that is spatially registered with a second image (input, enhanced, or fused), each location of a plurality of locations in the first image has the same coordinates as a unique location in the plurality of locations in the second image.

Each single-channel fused image If1 or If2 includes important information of the original images I1*a or I2*a as well as many enhanced details of the enhanced images I1*b or I2*b. In other words, each single-channel fused image If1 or If2 is spatially dynamic in two dimensions so that the strengths of each channel are emphasized and the weaknesses of each channel are de-emphasized on the regional-scale by the normalized enhancement gain Although the gains determined in Equation (5) and the weights determined in Equation (6) are dynamically calculated on the regional scale, they carry scale information for each of the local, regional, and global scales, due to application of each of the local and global scales in the enhancement processing and the determination of image quality metrics at the regional scale.

In embodiments, as shown in FIGS. 1 and 2, single-channel fused images If1 and If2 are provided to the multi-channel fusion component 108, wherein If1 and If2 were synchronized when captured by each of the image sensor 102 and were spatially registered by S/R component 104. Streaming image pairs If1 and If2 can be processed by the multi-channel fusion component 108, as long as each image pair are synchronized and registered.

Figure 3:
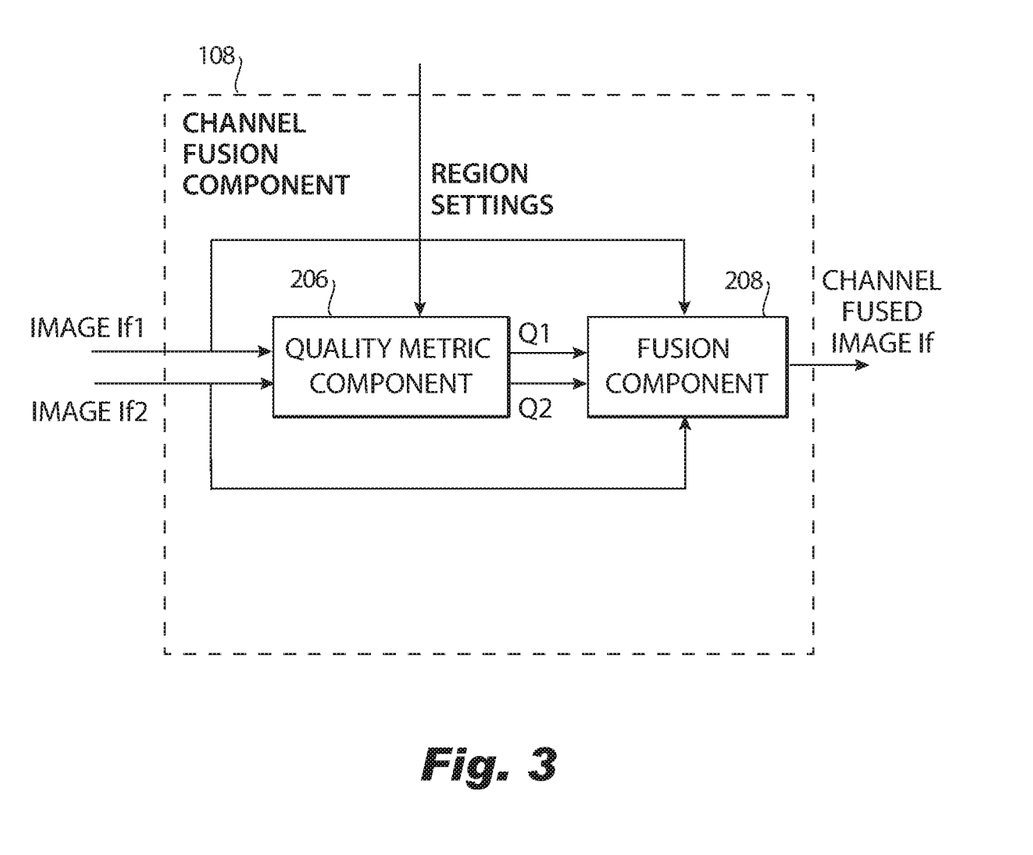
FIG. 3 is a block diagram of an exemplary embodiment of a channel fusion component of the MC image processing system.

With reference to FIG. 3, the multi-channel fusion component 108 receives images If1 and If2 and outputs channel fused image If. Images If1 and If2 are synchronized and registered relative to one another.

Multi-channel fusion component 108 includes quality metric component 206 and fusion component 208, which apply Equations (1)-(7) to images If1 and If2 as described above with respect to FIG. 2.

The quality metric component 206 determines an image quality metric Q of each of images If1 and If2. More specifically, for each location of image If1, the location functions as the center of the moving window in image If1, and an image quality metric Q1 is determined for that location using content of image If1 in a region covered by the moving window. For each location of image If2, the location functions as the center of the moving window in image If2, and an image quality metric Q2 is determined for that location using content of image If2 in a region covered by the moving window. The image quality metric Q is determined for each of the images If1 and If2 at each of its locations as the moving window's center location (ic,jc) is moved, e.g., pixel by pixel, for each iteration of determining the image quality metric Q. The moving window includes m×n pixels centered at location (ic,jc), with m, n defined by region settings that can be input via a user interface of the image processing system 100 or received by another processing device.

The region settings applied by channel fusion component can be the same or different from the region settings applied by the single-channel image fusion component 106, although they are normally the same. The image quality metric Q can be determined using, for example, an effective signal and noise (S/N), determined using Equations (2) and (3) (replacing subscripts a and b with subscripts 1 and 2, respectively) to determine the mean and standard deviation for a region centered at and covered by the moving window at the current position being processed. The image quality metric Q can be defined as the effective signal to noise ratio in accordance with Equation (4), which is computed for each position of the moving window.

The fusion component 108 receives the image quality metrics Q1 and Q2 and determines channel gain for each location in image If1 and its corresponding location in If2 in accordance with Equation (5), replacing superscripts a and b with superscripts 1 and 2 to indicate channels, respectively. Each location in image If2 corresponds to one of the locations of image If1. Since images If1 and If2 are spatially registered, each location in image If2 corresponds to a location in image If1 that has the same pixel coordinates.

The channel gain determined in Equation (5) can be normalized using Equation (6) to provide scene content-dependent normalized gain that is proportional to the channel gain. A minimum coefficient value of 0.1 can be used in the normalized weighting function of Equation (6) to ensure application of a minimum amount of blending from the enhanced image denoted by subscript "b" and the pre-enhanced image denoted by subscript "a". The coefficients in Equation (6) may be adjusted in practice to achieve more desirable results.

The fusion component 108 can further apply Equation (7) to fuse images If1 and If2 into channel fused image If, substituting subscripts "a" and "b" with subscripts "1" and "2," and substituting "If1" with channel fused image "If." The fused image If is generated by applying Equation (7) to each location of image If1 and the corresponding location in image If2 using the enhancement gain determined for the corresponding locations as a weighting function for the content of the corresponding regions. By applying the normalized channel gain to each location in image If1 and its corresponding location in image If2, wherein the image quality metric was determined for each of these locations on a regional scale, the channel fused image If is spatially dynamic in two dimensions so that the strengths of each channel are emphasized (i.e., weighted more heavily) and the weaknesses of each channel are de-emphasized per region by the normalized channel gain.

Figure 4:
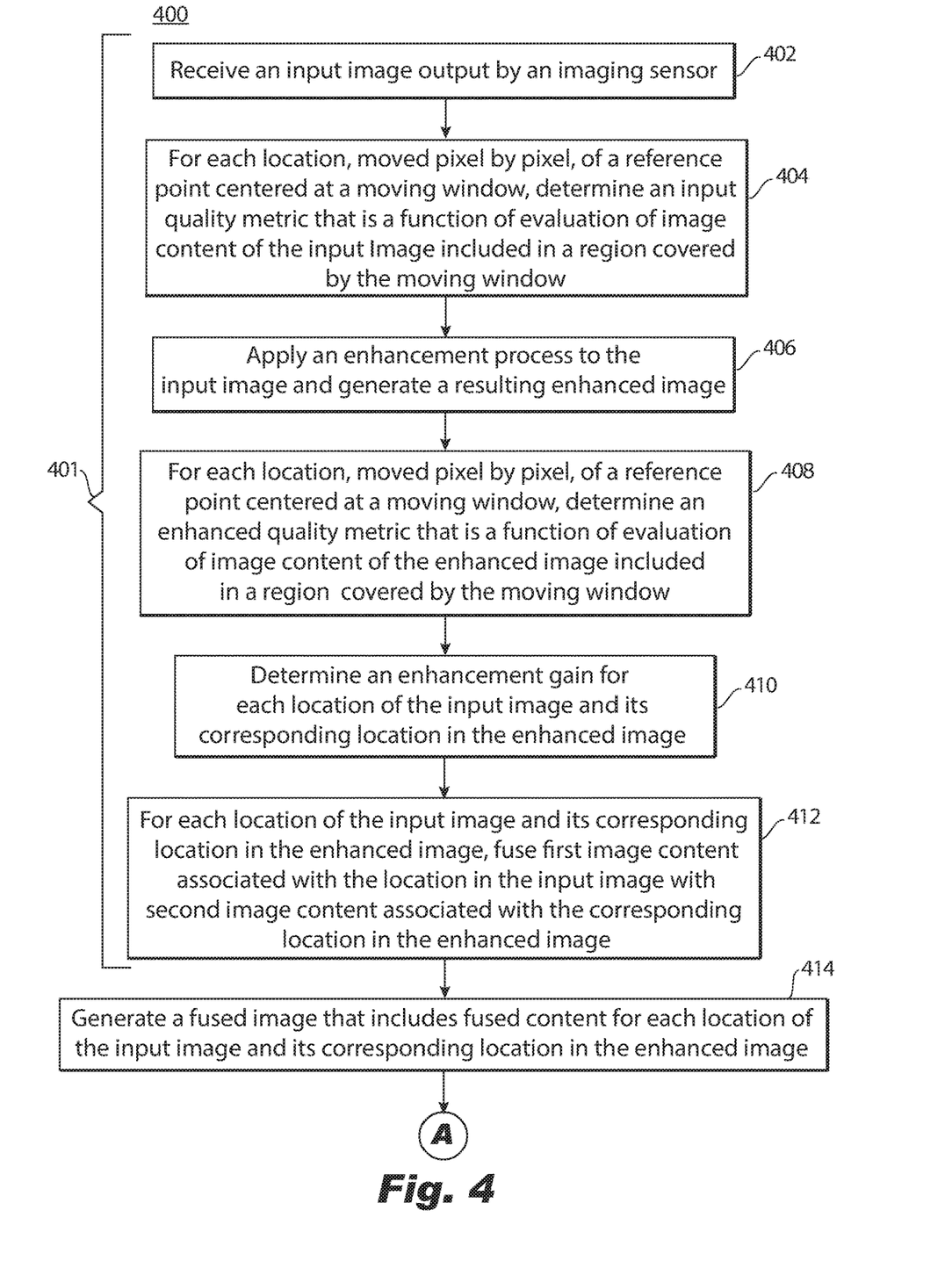
FIG. 4 is a flowchart of an example method of processing an input image in accordance with embodiments of the disclosure.
Figure 5:
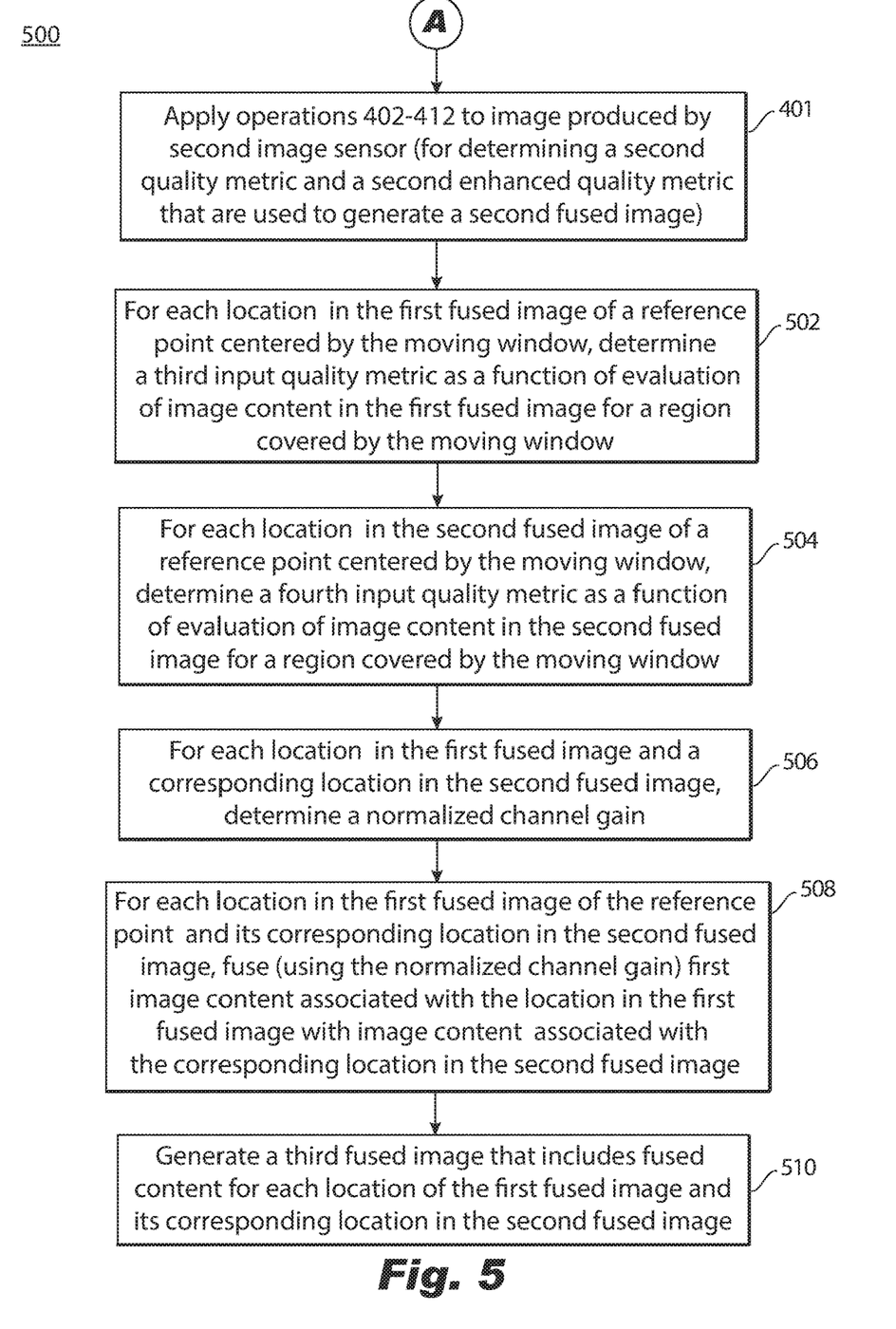
FIG. 5 is a flowchart of an example method of processing a second input image for fusion with the first input image in accordance with embodiments of the disclosure.

With reference now to FIGS. 4 and 5, shown are flow diagrams demonstrating implementation of the various exemplary embodiments. It is noted that the order of operations shown in FIGS. 4 and 5 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 4 shows a flowchart 400 that illustrates an example method in accordance with an embodiment. The method can be performed by a fusion image processing system, such as fusion image processing system 100 shown in FIG. 1. At operation 402, an input image output by an imaging sensor is received. At operation 404, an image quality metric is determined for each location of a reference point of a moving window, wherein the image quality metric is a function of evaluation of image content included in a region covered by the moving window. The moving window is moved through the input image, its reference point moving pixel by pixel, so that operation 404 is performed for each pixel.

At operation 406 an enhancement process, such as LACE, is applied to the input image that generates a resulting enhanced image. At operation 408, an enhanced image quality metric is determined for each location of the reference point of the moving window, wherein the enhanced image quality metric is a function of evaluation of image content included in the region covered by the moving window. Each pixel of the enhanced image has a turn to be the reference point, e.g., center, of the moving window. At operation 410, for each location in the input image (which is a pre-enhanced image) and its corresponding location in the enhanced image, a normalized enhancement gain is determined. The normalized enhancement gain for the corresponding locations is a function of the image quality metric and the enhanced image quality metric that were determined for each of the respective locations.

At operation 412, for each location of the input image and its corresponding location in the enhanced image, first image content associated with the location in the input image is fused with second image content associated with the corresponding location in the enhanced image. The fusing is a function of the first image content and the second image content as weighted by the normalized enhancement gain determined for the corresponding locations. At operation 414, a fused image is generated that includes fused content determined for each of the locations in the input image and its corresponding location in the enhanced image. Operation 401 includes operations 402, 404, 406, 408, 410, and 412. In embodiments, the fused image can be output for display.

FIG. 5 shows a flowchart 500 that illustrates an example method performed by a fusion image processing system, such as fusion image processing system 100 shown in FIG. 1. The method illustrated by flowchart 400 in FIG. 4 continues at operation 401, which is repeated as applied to a second input image output by a second imaging sensor. The second input image is received, wherein the second input image is synchronized and spatially registered with the input image, wherein the first and second imaging sensors have disparate imaging sensitivities and/or responsivities for capturing images and/or output images, or different qualities relative to one another.

Accordingly, at operation 401, a second input image output by a second imaging sensor is received, wherein the second input image is synchronized and spatially registered with the input image, wherein the first and second imaging sensors have disparate imaging sensitivities and/or responsivities for capturing images and/or output images of different qualities relative to one another. Each location of the second input image functions, in turn, as the reference of the moving window for determining a second input quality metric as a function of evaluation of image content in the second input image included in the region covered by the moving window.

The enhancement process is applied to the second input image and a resulting second enhanced image is generated that is spatially registered with the second input image. Each location of the second enhanced input image functions, in turn, as the reference of the moving window for determining a second enhanced input quality metric as a function of evaluation of image content in the second enhanced input image included in the region covered by the moving window. For each location in the second input image and its corresponding location in the second enhanced input image, a second normalized enhancement gain is determined.

For each location in the second input image and its corresponding location in the second enhanced input image, image content included in the region covered by the moving window when centered at the location in the second input image is fused with image content included in the region covered by the moving window when centered at the location in the second enhanced image. The fusion is weighted by the second normalized enhancement gain determined for the corresponding locations. A second fused image is generated that includes fused content determined for each of the locations in the second input image and its corresponding location in the second enhanced image.

At operation 502, for each location in the first fused image of the reference of the moving window, a third input quality metric is determined as a function of evaluation of first fused image content in the first fused image for the region covered by the moving window. At operation 504, for each location in the second fused image of the reference of the moving window, a fourth input quality metric is determined as a function of evaluation of second fused image content in the second fused image for the region covered by the moving window. At operation 506, for each location in the first fused image and its corresponding location in the second fused image, a normalized channel gain is determined. The normalized channel gain is a function of the first fused quality metric and the second fused quality metric associated with the corresponding locations.

At operation 508, for each location in the first fused image and its corresponding location in the second fused image, the first fused image content associated with the location in the first fused image is fused with the second fused image content associated with the corresponding location in the second fused image. This fusing is a function of the first fused image content and the second fused image content, as weighted by the normalized channel gain determined for the corresponding locations. At operation 510, a third fused image is generated that includes fused content for each location of the first fused image and its corresponding location in the second fused image.

Aspects of the present disclosure are described above with reference to flow diagram illustrations and/or block diagrams of methods, apparatus (systems) and computer program products according to embodiments of the disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

Embodiments of the fusion image processing system 100 may be implemented or executed by one or more computer systems. For example, single-channel image fusion component 106 and multi-channel fusion component 108, or multiple instances thereof, can be implemented using one or more computer systems such as example computer system 602 illustrated in FIG. 6. Each computer system 602 can implement one or more of single-channel image fusion component 106 and multi-channel fusion component 108, or multiple instances thereof. In various embodiments, computer system 602 may include a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 602 is only one example of a suitable system and is not intended to suggest any limitation as to the scope of use or functionality of embodiments of the disclosure described herein. Regardless, computer system 602 is capable of being implemented and/or performing any of the functionality set forth hereinabove.

Computer system 602 may be described in the general context of computer system-executable instructions, such as program modules, being executed by a computer system. Generally, program modules may include routines, programs, objects, components, logic, data structures, and so on that perform particular tasks or implement particular abstract data types. Computer system 602 may be practiced in distributed data processing environments where tasks are performed by remote processing devices that are linked through a communications network. In a distributed data processing environment, program modules may be located in both local and remote computer system storage media including memory storage devices.

Figure 6:
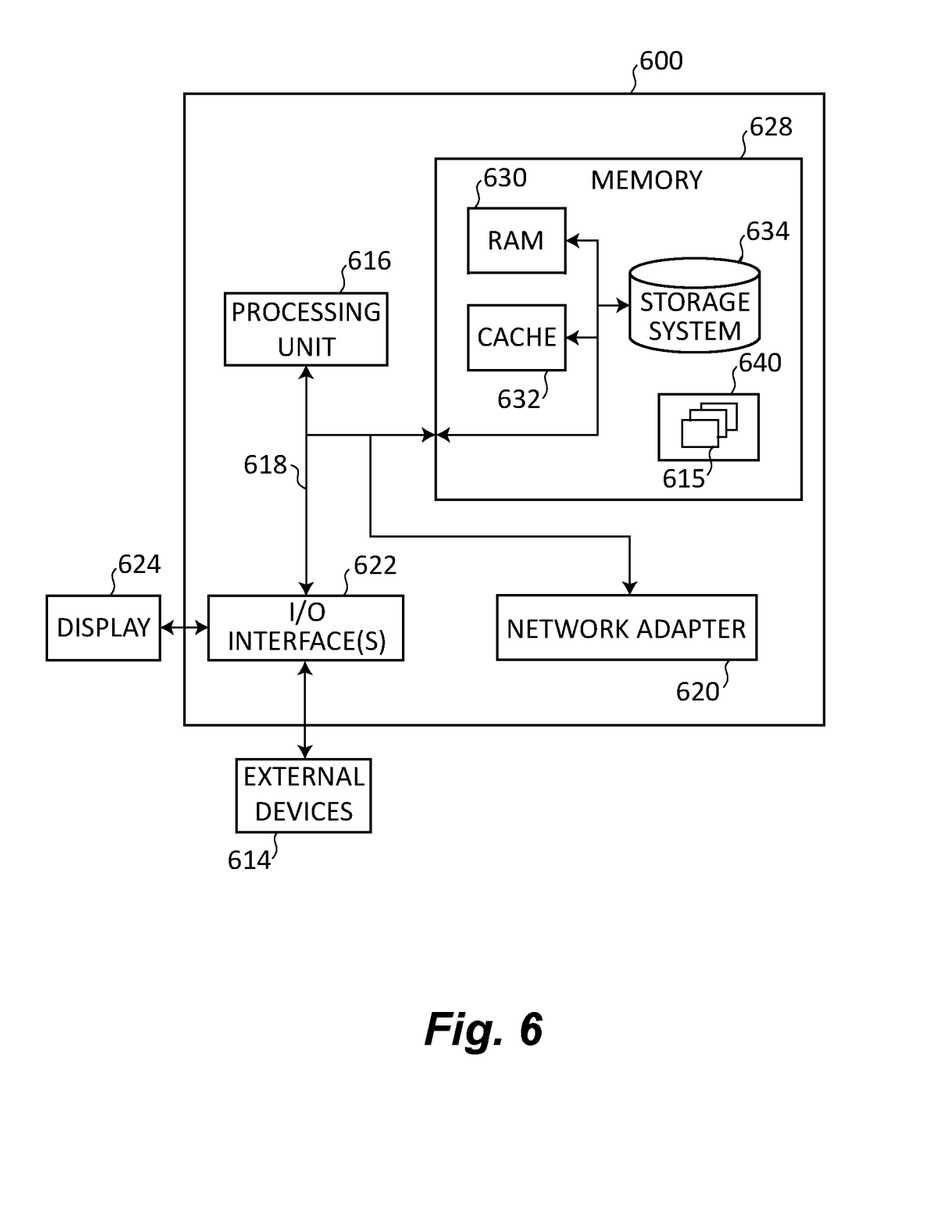
FIG. 6 is a block diagram of an exemplary computer system configured to implement components of the image processing system in accordance with embodiments of the disclosure.

Computer system 602 is shown in FIG. 6 in the form of a general-purpose computing device. The components of computer system 602 may include, but are not limited to, one or more processors or processing units 616, a system memory 628, and a bus 618 that couples various system components including system memory 628 to processor 616. Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 602 typically includes a variety of computer system readable media. Such media may be any available media that is accessible by the TIS 100, and it includes both volatile and non-volatile media, removable and non-removable media.

System memory 628 can include computer system readable media in the form of volatile memory, such as random access memory (RAM) 830 and/or cache memory 832. Computer system 802 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 615, such as for performing the operations of flowcharts 400 and 600 shown in FIGS. 4 and 5, respectively, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 602 may also communicate with one or more external devices 614 such as a keyboard, a pointing device, a display 624, etc.; one or more devices that enable a user to interact with computer system 602; and/or any devices (e.g., network card, modem, etc.) that enable the TIS 100 to communicate with one or more other computing devices. Such communication can occur via Input/Output (I/O) interfaces 622. Still yet, computer system 602 can communicate with one or more networks such as a local area network (LAN), a general wide area network (WAN), and/or a public network (e.g., the Internet) via network adapter 620. As depicted, network adapter 620 communicates with the other components of the TIS 100 via bus 618. It should be understood that although not shown, other hardware and/or software components could be used in conjunction with computer system 602. Examples, include, but are not limited to: microcode, device drivers, redundant processing units, external disk drive arrays, RAID systems, tape drives, and data archival storage systems, etc.

The flow diagram and block diagrams in the Figures illustrate the architecture, functionality, and operation of possible implementations of systems, methods and computer program products according to various embodiments of the present disclosure. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method the ability to process an image that is enhanced and/or images from disparate imaging sensors to produce one or more fused images, using a technique that takes advantage of strengths of each of the pre-enhanced image and enhanced images and/or images output by the different imaging sensors, while minimizing weaknesses in such images. The method can be used for one, two or more imaging sensors. The fused images are dynamic with respect to space, since the images are evaluated and fused region by region. The fused images can also be dynamic with respect to time, since the method can be applied to streaming synchronized images that are fused over time.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. An image processing system comprising:
   a memory configured to store instructions;
   a processor disposed in communication with the memory, wherein the processor, upon execution of the instructions is configured to:
      receive an input image output by an imaging sensor;
      for each location of a plurality of locations of a reference point of a moving window in the input image, determine a first image quality metric as a function of quality of first image content included in a region covered by the moving window, wherein the window is sized to include at least a significant portion of a target of interest;
      apply an enhancement process to the input image and generate a resulting enhanced image that is spatially registered with the input image;
      for each location of the plurality of locations of the reference point of the moving window in the enhanced image, determine a second image quality metric as a function of quality of second image content included in the region covered by the moving window;
      for each location of the plurality of locations, determine first fused content by a first fusing of the first image content with the second image content, the first fusing being a function of the first image content, the first image quality metric, the second image content, and the second image quality metric associated with the location; and
      generate a fused image that includes the first fused content determined for each of the locations of the plurality of locations.

2. The image processing system of claim 1, wherein the moving window is sized for the plurality of locations to include at least tens of locations.

3. The image processing system of claim 1, wherein the enhancement process is a contrast enhancement process that is applied to the input image on a local scale sized to capture details of features of a target of interest.

4. The image processing system of claim 3, wherein processing by the contrast enhancement process also uses a global scale sized to capture frame-wide statistics.

5. The image processing system of claim 4, wherein the processor, upon execution of the instructions, is further configured to determine an enhancement gain for each location of the plurality of locations in the input image and the second image as a function of a ratio of the first image quality metric relative to the second image quality metric that were determined for the location, wherein determining the first fused content for the location is a function of the enhancement gain determined for the location.

6. The image processing system of claim 5, wherein determining the first fused content includes applying the enhancement gain as a weighting functions.

7. The image processing system of claim 1, wherein,
   determining the first image quality metric for each location of the plurality of locations in the input image includes determining an effective signal/noise ratio for the region covered by the moving window; and
   determining the second image quality metric for each location of the plurality of locations in the second input image includes determining an effective signal/noise ratio for the region covered by the moving window.

8. The image processing system of claim 1, wherein the input image is an image of an input image stream, and receiving the input image, determining the first image quality metric, applying the enhancement process, determining the second image quality metric, and determining the first fused content are performed for additional streamed images of the input image stream.

9. The image processing system of claim 1, wherein the processor, upon execution of the instructions, is further configured to:
   receive a second input image output by a second imaging sensor, the second input image being synchronized and spatially registered with the input image, wherein the imaging sensor and the second imaging sensor have disparate imaging sensitivities and/or responsivities for capturing images relative to one another or output images having different qualities relative to one another;
   for each location of the plurality of locations of the reference point of the moving window in the second input image, determine a third image quality metric as a function of quality of third image content included in the region covered by the moving window;
   apply the enhancement process to the second input image and generate a resulting second enhanced image that is spatially registered with the second input image;
   for each location of the plurality of locations of the reference point of the moving window in the second enhanced image, determine a fourth image quality metric as a function of quality of fourth image content included in the region covered by the moving window;

for each of the locations of the plurality of locations, determine second fused content by a second fusing of the third image content with the fourth image content, the second fusing being a function of the third image content, the third image quality metric, the fourth image content, and the fourth image quality metric associated with the location; and generate a second fused image that includes the second fused content determined for each of the plurality of locations.

10. The image processing system of claim 9, wherein the second fused image is spatially registered with the fused image.

11. The image processing system of claim 9, wherein the fused image is spatially registered with the input image and the second fused image is spatially registered with the second input image, and each location of the plurality of locations has the same coordinates as a unique location of the second plurality of locations.

12. The image processing system of claim 9, wherein the imaging sensor is configured to sense images using a first light wavelength and the second imaging sensor is configured to sense images using a second light wavelength that is different than the first light wavelength.

13. The image processing system of claim 12, wherein at least one of the first and second light wavelengths is in the infrared range.

14. The image processing system of claim 12, wherein both of the first and second light wavelengths are in the infrared range, wherein the imaging sensor is configured to sense images using a first light wavelength and the second imaging sensor is configured to sense images using a second light wavelength that is different than the first light wavelength.

15. The image processing system of claim 12, wherein the processor, upon execution of the instructions, is further configured to:

for each location of a second plurality of locations of the reference point of the moving window in the fused image, determine a fifth image quality metric as a function of quality of fifth image content included in the region covered by the moving window;

for each of the locations of the second plurality of locations of the reference point of the moving window in the second fused image, determine a sixth image quality metric as a function of quality of sixth image content included in the region covered by the moving window;

for each location of the second plurality of locations, determine third fused content by a third fusing of the fifth image content with the sixth image content, the fifth fusing being a function of the fifth image content, the fifth image quality metric, the sixth image content, and the sixth image quality metric associated with the location; and generate a third fused image that includes the third fused content determined for each of the locations of the second plurality of locations.

16. A method of processing an image, the method comprising:

receiving an input image output by an imaging sensor;

for each location of a plurality of locations of a reference point of a moving window in the input image, determining a first image quality metric as a function of quality of first image content included in a region covered by the moving window, wherein the window is sized to include at least a significant portion of a target of interest;

applying an enhancement process to the input image and generate a resulting enhanced image that is spatially registered with the input image;

for each location of the plurality of locations of the reference point of the moving window in the enhanced image, determining a second image quality metric as a function of quality of second image content included in the region covered by the moving window;

for each location of the plurality of locations, determining first fused content by a first fusing of the first image content with the second image content, the first fusing being a function of the first image content, the first image quality metric, the second image content, and the second image quality metric associated with the location; and generating a fused image that includes the first fused content determined for each of the locations of the plurality of locations.

17. The method as recited in claim 16, further comprising:

receiving a second input image output by a second imaging sensor, the second input image being synchronized and spatially registered with the input image, wherein the imaging sensor and the second imaging sensor have disparate imaging sensitivities and/or responsivities for capturing images relative to one another or output images having different qualities relative to one another;

for each location of the plurality of locations of the reference point of the moving window in the second input image, determining a third image quality metric as a function of quality of third image content included in the region covered by the moving window;

applying the enhancement process to the second input image and generate a resulting second enhanced image that is spatially registered with the second input image;

for each location of the plurality of locations of the reference point of the moving window in the second enhanced image, determining a fourth image quality metric as a function of quality of fourth image content included in the region covered by the moving window;

for each of the locations of the plurality of locations, determining second fused content by a second fusing of the third image content with the fourth image content, the second fusing being a function of the third image content, the third image quality metric, the fourth image content, and the fourth image quality metric associated with the location; and generating a second fused image that includes the second fused content determined for each of the plurality of locations.

18. The method of claim 17, further comprising:

for each location of a second plurality of locations of the reference point of the moving window in the fused image, determining a fifth image quality metric as a function of quality of fifth image content included in the region covered by the moving window;

for each of the locations of the second plurality of locations of the reference point of the moving window in the second fused image, determining a sixth image quality metric as a function of quality of sixth image content included in the region covered by the moving window;

for each location of the second plurality of locations, determining third fused content by a third fusing of the fifth image content with the sixth image content, the fifth fusing being a function of the fifth image content, the fifth image quality metric, the sixth image content, and the sixth image quality metric associated with the location; and generating a third fused image that includes the third fused content determined for each of the locations of the second plurality of locations.

19. A non-transitory computer readable storage medium having one or more computer programs stored therein, the computer programs comprising instructions, which when executed by a processor of a computer system, cause the processor to:

receive an input image output by an imaging sensor;

for each location of a plurality of locations of a reference point of a moving window in the input image, determine a first image quality metric as a function of quality of first image content included in a region covered by the moving window, wherein the window is sized to include at least a significant portion of a target of interest;

apply an enhancement process to the input image and generate a resulting enhanced image that is spatially registered with the input image;

for each location of the plurality of locations of the reference point of the moving window in the enhanced image, determine a second image quality metric as a function of quality of second image content included in the region covered by the moving window;

for each location of the plurality of locations, determine first fused content by a first fusing of the first image content with the second image content, the first fusing being a function of the first image content, the first image quality metric, the second image content, and the second image quality metric associated with the location; and generate a fused image that includes the first fused content determined for each of the locations of the plurality of locations.

20. The non-transitory computer readable storage medium as recited in claim 19, wherein the computer programs associated with the data layer, when executed by a computer system, cause the computer system to:

receive a second input image output by a second imaging sensor, the second input image being synchronized and spatially registered with the input image, wherein the imaging sensor and the second imaging sensor have disparate imaging sensitivities and/or responsivities for capturing images relative to one another or output images having different qualities relative to one another;

for each location of the plurality of locations of the reference point of the moving window in the second input image, determine a third image quality metric as a function of quality of third image content included in the region covered by the moving window;

apply the enhancement process to the second input image and generate a resulting second enhanced image that is spatially registered with the second input image;

for each location of the plurality of locations of the reference point of the moving window in the second enhanced image, determine a fourth image quality metric as a function of quality of fourth image content included in the region covered by the moving window;

for each of the locations of the plurality of locations, determine second fused content by a second fusing of the third image content with the fourth image content, the second fusing being a function of the third image content, the third image quality metric, the fourth image content, and the fourth image quality metric associated with the location;

generate a second fused image that includes the second fused content determined for each of the plurality of locations, for each location of a second plurality of locations of the reference point of the moving window in the fused image, determine a fifth image quality metric as a function of quality of fifth image content included in the region covered by the moving window;

for each of the locations of the second plurality of locations of the reference point of the moving window in the second fused image, determine a sixth image quality metric as a function of quality of sixth image content included in the region covered by the moving window;

for each location of the second plurality of locations, determine third fused content by a third fusing of the fifth image content with the sixth image content, the fifth fusing being a function of the fifth image content, the fifth image quality metric, the sixth image content, and the sixth image quality metric associated with the location; and generate a third fused image that includes the third fused content determined for each of the locations of the second plurality of locations.

* * * * *